(12) United States Patent
Yi

(10) Patent No.: US 7,760,634 B2
(45) Date of Patent: Jul. 20, 2010

(54) RADIO COMMUNICATION SYSTEM AND METHOD HAVING A RADIO LINK CONTROL LAYER

(75) Inventor: Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 11/935,353

(22) Filed: Nov. 5, 2007

(65) Prior Publication Data

US 2008/0064444 A1    Mar. 13, 2008

Related U.S. Application Data

(60) Continuation of application No. 11/559,863, filed on Nov. 14, 2006, which is a division of application No. 09/972,051, filed on Oct. 9, 2001, now Pat. No. 7,154,873.

(30) Foreign Application Priority Data

Oct. 7, 2000   (KR) ............... 2000-59015
Oct. 7, 2000   (KR) ............... 2000-59016

(51) Int. Cl.
    *G01R 31/08*   (2006.01)
(52) U.S. Cl. ............... 370/231; 370/474; 370/537; 370/538; 370/539
(58) Field of Classification Search ............... 370/398, 370/468, 231, 474, 537, 538, 539, 349; 455/560; 713/160, 190, 181; 726/13
    See application file for complete search history.

(56) References Cited

U.S. PATENT DOCUMENTS

| 5,497,404 A | | 3/1996 | Grover et al. |
| 5,570,362 A | * | 10/1996 | Nishimura ............... 370/466 |
| 5,708,659 A | | 1/1998 | Rostoker et al. |
| 5,737,332 A | * | 4/1998 | Corrigan et al. ............. 370/394 |
| 5,838,782 A | | 11/1998 | Lindquist et al. |
| 5,872,786 A | * | 2/1999 | Shobatake .................. 370/398 |

(Continued)

FOREIGN PATENT DOCUMENTS

JP   62-155642   7/1987

(Continued)

OTHER PUBLICATIONS

3GPP RLC Protocol Specification TS 25.322 v1.1.0 Jun. 1999.*

(Continued)

*Primary Examiner*—Kwang B Yao
*Assistant Examiner*—Jung Liu
(74) *Attorney, Agent, or Firm*—Lee, Hong, Degerman, Kang & Waimey

(57) ABSTRACT

Disclosed are a radio link control (RLC) entity and a data processing method for the RLC entity. The RLC entity includes a transmission data storing module that stores PDUs corresponding to SDUs transmitted from a first upper layer and outputs the stored PDUs by SDU units, a ciphering module that ciphers the PDUs stored in the transmission data storing module and transmitting the ciphered PDUs to a first RLC entity, a deciphering module that deciphers the ciphered PDUs transmitted from a second RLC entity, and a received data storing module that stores the deciphered PDUs and outputs the PDUs toward a second upper layer in the form of SDU units.

8 Claims, 11 Drawing Sheets

U.S. PATENT DOCUMENTS

| | | | |
|---|---|---|---|
| 6,028,933 A * | 2/2000 | Heer et al. | 713/169 |
| 6,044,468 A * | 3/2000 | Osmond | 726/5 |
| 6,052,786 A * | 4/2000 | Tsuchida | 726/14 |
| 6,101,255 A * | 8/2000 | Harrison et al. | 380/52 |
| 6,181,795 B1 * | 1/2001 | Chandersekaran et al. | 380/280 |
| 6,272,117 B1 | 8/2001 | Choi et al. | |
| 6,424,714 B1 * | 7/2002 | Wasilewski et al. | 380/200 |
| 6,480,477 B1 | 11/2002 | Treadway et al. | |
| 6,480,957 B1 * | 11/2002 | Liao et al. | 713/170 |
| 6,683,860 B1 | 1/2004 | Forssell et al. | |
| 6,725,039 B1 | 4/2004 | Parmar et al. | |
| 6,754,217 B1 | 6/2004 | Ahn et al. | |
| 6,791,963 B1 | 9/2004 | Hwang et al. | |
| 6,842,445 B2 | 1/2005 | Ahmavaara et al. | |
| 6,882,727 B1 * | 4/2005 | Vialen et al. | 380/33 |
| 2001/0055298 A1 * | 12/2001 | Baker et al. | 370/349 |
| 2005/0239484 A1 * | 10/2005 | Park et al. | 455/466 |

FOREIGN PATENT DOCUMENTS

| | | |
|---|---|---|
| WO | WO 00/21253 | 4/2000 |

OTHER PUBLICATIONS

3GPP RLC Protocol Specification TS 25.322 v3.2.0 Mar. 2000.*
3GPP Radio Interface Protocol Architecture V3.3.0 Jun. 1999.*
3rd Generation Partnership Project; Technical Specification Group-Radio Access Network WG2 Meeting #17 Sophia Antipolis, France.
H. Holma and A. Toskala: "WCDMA for UMTS—Chapter 7 Radio Interface Protocols" John Wiley & Sons, Ltd.
3rd Generation Partnership Project; Technical Specification Group-Radio Access Network RLC Protocol Specification.

* cited by examiner

FIG. 2
Related Art

| D/C | Sequence Number | | | Oct1 |
| Sequence Number | | P | HE | Oct2 |
| Length Indicator | | | E | Oct3 |

. . .

| Length Indicator | E |
| Data | |
| PAD or a piggybacked STATUS PDU | | OctN |

FIG. 3
Related Art

| D/C | PDU type | SUFI 1 | Oct1 |
| SUFI$_1$ | | | Oct2 |
| . . . | | | . |
| SUFI$_K$ | | | . |
| PAD | | | OctN |

FIG. 4
Related Art

| D/C | PDU type | RSN | R | Oct1 |
|---|---|---|---|---|
| PAD ||||Oct2 ... OctN |

FIG. 6
Related Art

| Sequence Number | E | Oct1 |
|---|---|---|
| Length Indicator | E | Oct2 |

⋮

| Length Indicator | E | |
|---|---|---|
| data | | |
| PAD | | OctN |

RLC AM-Entity

RADIO COMMUNICATION SYSTEM AND METHOD HAVING A RADIO LINK CONTROL LAYER

CROSS-REFERENCE TO RELATED APPLICATIONS

This application is a continuation of U.S. application Ser. No. 11/559,863, filed Nov. 14, 2006, which is a divisional of U.S. application Ser. No. 09/972,051, filed Oct. 9, 2001, now U.S. Pat. No. 7,154,873, issued Dec. 26, 2006, which pursuant to 35 U.S.C. §119(a), claims the benefit of earlier filing date and right of priority to Korean Application Nos. 2000-59015, filed on Oct. 7, 2000, and 2000-59016, filed on Oct. 7, 2000, the contents of which are hereby incorporated by reference herein in their entirety.

BACKGROUND OF THE INVENTION

1. Field of the Invention

The present invention relates to a radio communication system and method having a radio link control (RLC) layer. More specifically, the invention relates to ciphering the payload data communicated by the radio communication system.

2. Background of the Related Art

Many efforts are being made to develop and study communication technology admitting multimedia access without spatiotemporal imitations. Lately, the development of digital data processing and transmission technology have enabled the realization of a real-time global data communication system, using satellite, wireless, and wire communications. Access to information is freely available regardless of whether the information is voice, still image, or moving picture information. IMT-2000 will be one of the communication technologies supporting multimedia access.

An RLC layer is the second layer of a 3GPP protocol that controls data links and corresponds to the second layer of the 7-layered QSI model. RLC species used in 3GPP are mainly divided into a transparent (Tr) mode specie, to which no RLC header is added, and a non-transparent, (NTR) mode specie, to which an RLC header is added. NTr mode is subdivided into an unacknowledged mode (UM), having no acknowledgment (ACK) signal from a receive stage, and an acknowledged mode (AM), having an ACK signal from the receive stage. Therefore, RLC presently uses three modes, designated as Tr, UM, and AM.

FIG. 1 illustrates a related art block diagram of an RLC AM entity structure. On a transmitting side of the AM entity, segmentation and concatenation are carried out through block 101 to change service data units (SDUs), stepping down from an upper layer, into uniformly sized protocol data units (PDUs). Headers containing sequence numbers (SNs) are added to the PDUs through block 102.

The PDU to which the header is added is transmitted to a multiplexer (MUX) 104 and stored in a retransmission buffer 103, for such later use as may arise. The PDU is conveyed by MUX 104 to ciphering block 105 to encrypt it fox data security. The encrypted PDU is temporarily stored in a transmission buffer 106, for later transmission to a field setting block 107.

In the field setting block 107, fields such as a DC and poll field, but not the sequence number of the RLC header, are set and then transmitted to a receive side AM entity. Such a PDU carrying data that has been stepped down from an upper layer is called an AM data (AMD) PDU.

FIG. 2 illustrates a structure of an AMD PDU. The AMD PDU is constructed with a header group, a length indicator (LI) group, a data field, and a padding (PAD) or piggybacked status PDU field.

The header group includes: (1) a sequence number field representing the order of the respective AMP PDUs, (2) a 1-bit D/C field indicating whether the corresponding AMD PDU carries data information or control information, (3) a 1-bit polling field (P field) to request a status report from a receiving side, (4) a 2-bit header extension (HE) field identifying whether the next field is a data field or an LI field, and (5) a 1-bit extension (E) field identifying whether the next field is a data field or the LI field followed by an E bit field.

The LI octet contains an LI field and an E bit field, in which the LI field identifies boundaries of the respective SDUs when the PDU includes a plurality of SDUs. Each LI octet represents an octet count from the first octet of the data part to the last octet of the respective SDUs. The respective LIs for the SDUs included in the PDU are called the LI group.

The data field includes at least one SDU stepped down from the upper layer. Since the size of the data field is variable, padding is used to octet-align the sizes of all the PDUs.

When ciphering is performed on the AMD PDU, the first two octets, which are part of the header group, including the sequence number are not ciphered. The rest of the AMD PDU is ciphered.

In the AM entity, both a control PDU and the AMD PDU exist. Varieties of the control PDU in dude a status PDU carrying status information, a reset PDU resetting the AM entity, and a reset ACK PDU informing the acknowledgment (ACK) of the reset PDU.

FIG. 3 illustrates a structure of a status PDU. FIG. 4 illustrates a structure of a reset ACK PDU. The control PDUs, which are generated from the RLC control unit, are transmitted to the field setting block without undergoing the ciphering. The D/C and PDU type fields are set and then the control PDU is transmitted to the receiving RLC AM entity.

The D/C field is set to 1 for the AMD PDU and set to 0 for the control PDU. When the AMD PDU is not completely filled with data, the remaining space is padded. When there is a PAD in the AMD PDU, the field setting block 107 enables the transmission of a status PDU instead of the PAD, so as to increase the data transmission efficiency. In this case, the status PDU is called a piggybacked status PDU. A demultiplex/routing part 108 checks the D/C field. If the D/C field value is 0, the control PDU is instantly sent upward to the RLC control unit 100, since a '0' identifies a control PDU. If the D/C field value is 1, the AMD PDU is instantly sent upward to the receiver buffer 109, since a '1' identifies the AMD PDU.

The RLC AM entity supports one or two logical channels for each radio bearer set-up. In FIG. 1, solid and dotted lines indicate the cases of using one or two logical channels, respectively. Data and control channels are differentiated when two logical channels are used. Therefore, the AMD PDU is immediately transmitted to the receiver buffer 109 and the control PDU is transmitted to the RLC control unit 100, via the demultiplex/routing part 108.

Receiver buffer 109 checks the receiving status of the respective AMD PDUs. If an AMD PDU is not received when expected, the receiver buffer 109 sends a NACK signal to the transmitting side to request a retransmission of the missing AMD PDU. The received PDUs are stored in the receiver buffer 109 until all of the PDUs forming a complete SDU are received. Thereafter, the receiver buffer 109 sends the PDUs to the decipherer 110 as SDU units.

The PDUs are deciphered by a deciphering part 110 and data are extracted only by removing RLC headers and piggybacked information from the respective PDUs, in block 111. Thus, the SDU is constructed with pure data through block 111. Subsequently, the SDU is sent upward to an upper layer, though a reassembly part 112.

Unfortunately, the related art has problems in transmitting the AMD PDU. In order for the transmitting side to transmit the piggybacked status PDU, the field setting block 107 checks whether a PAD exists. When a PAD exists, the piggybacked status PDU replaces the PAD in the AMD PDU. Because the AMD PDU has been ciphered already, the ciphered AMD PDU has to be deciphered in the field setting block 107 to determine the exact location of the PAD and whether the PAD exists. Moreover, the deciphered AMD PDU should be ciphered before transmitting the AMID PDU. Therefore, the deciphering/ciphering has to be cared out in the field setting block unnecessarily.

The PDUs stored in the receiver buffer 109 have to be deciphered to determines which PDUs belong to each SDU. Therefore, the receiver buffer also needs to be able to decipher the PDU.

The repeated ciphering/deciphering reduces the processing speed and efficiency of the AMD PDU data and further degrades the system performance.

The RLC has an SDU discard function used for preventing the overflow of a buffer. When this function is used, PDUs corresponding to the SDU are discarded from both the transmitting buffer and the receiver buffer. Since all of the ciphered PDUs are stored in the transmitting and receiver buffers, the transmitting and receiver buffers require the deciphering function commonly.

FIG. 5 illustrates a construction of a related art RLC UM entity. Segmentation and concatenation are performed by block 122 to change the SDUs, stepping down from an upper layer through the UM-SAP, into uniformly sized PDUs. Subsequently, a ciphering part 123 ciphers the PDUs for data security. Then, an RLC header part 124 adds headers containing sequence numbers to the PDUs forming an unacknowledged mode data UMD PDU. A transmission buffer 125 stores and transmits the UMD PDU to a receiving side.

The UMD PDU is used when an ACK signal to the transmitting side from the receiving side is not necessary. An AMD PDU is used when the ACK signal is necessary.

As shown in FIG. 6, the UMD PDU is constructed wit a header group, an LI group, a data field, and a PAD field. The header group includes a sequence number field representing the order of the respective PDUs. The header group also has 1-bit extension (E) field indicating whether the next field is the data field or the LI field followed by an extension bit field.

The data field includes at least one SDU stepped down from the upper layer. Since the size of the data field is variable, padding is performed to octet-align the sizes of all the PDUs.

In the same manner as the AMD PDU, the LI group in the UMD PDU is constructed with an LI field and an E bit field. The LI field identifies the boundaries of the respective SDUs, when the PDU includes a plurality of SDUs. Each LI represents an octet count from the first octet of the data field to the last octet of the respective SDUs. The respective LIs for the SDUs included in the PDU are called the LI group.

The first octet is the header and is not ciphered. The rest of the UMD PDU is ciphered.

Referring again to FIG. 5, the RLC UM entity stores the transmitted UMD PDU in the receiver buffer 130. When all of the PDUs forming a complete SDU are received, the stored PDUs are transmitted to block 129 by the respective SDU units. Thereafter, the headers of the PDUs are removed in block 129 and the PDUs are deciphered by a deciphering part 128. The deciphered PDUs are transmitted to an upper layer through a reassembly part 127.

Unfortunately, the related art has problems in transmitting the UMD PDU using the RLC UM entity. Because the PDUs are encrypted before being conveyed to the receive-buffer 130, deciphering has to be performed by the receiver buffer to determine which PDU belongs to which SDU. Therefore, the receiver buffer needs a deciphering function.

The RLC has an SDU discard function used for preventing the overflow of a buffer. When this function is used, PDUs corresponding to the SDU are discarded from both the transmitting and receiver buffers. Since all of the ciphered PDUs are stored in the transmitting and receiver buffers, the transmitting and receiver buffers require the deciphering function commonly.

SUMMARY OF THE INVENTION

Accordingly, the invention is intended to solve at least the above problems and/or disadvantages and to provide at least the advantages described hereinafter.

An object of the present invention is to provide a radio communication system having an RLC layer enabling the system to perform the transmission and reception of PDUs more effectively.

Another object of the present invention is to provide a data processing method in a radio communication system having an RLC layer enabling the system to process PDUs faster in an RLC entity.

A data transmission module of a radio communication system having an RLC entity, according to the present invention, performs ciphering as a final processing step after a transmission buffer. And, a data receiving module of a radio communication system having the RLC entity carries out deciphering as a first processing step before a receiver buffer. An RLC entity according to the present invention includes an RLC AM entity and an RLC UM entity.

To achieve these objects and other advantages and in accordance with the purpose of the invention, as embodied and broadly described herein, a data transmission module according to the present invention includes a transmission data storing module storing PDUs corresponding to SDUs transmitted from a first upper layer and outputting the stored PDUs by SDU unit, a ciphering module ciphering the PDUs stored in the transmission data storing module and transmitting the ciphered PDUs to a second RLC entity, a deciphering module deciphering ciphered PDUs transmitted from a first RLC entity, and a received data storing module storing the deciphered PDUs and outputting the PDUs toward a second upper layer by SDU unit.

In another aspect of the present invention, in an RLC entity having a transmission buffer, a data processing method in the RLC entity includes storing SDUs stepping down from a first upper layer in the transmission buffer in PDUs, ciphering the PDUs stored in the transmission buffer, and transmitting the ciphered PDUs to a second RLC entity corresponding to a receiving side.

In another aspect of the present invention, in an RLC entity having a receiver buffer, a data processing method in the RLC entity includes receiving and deciphering PDUs received from a first RLC entity corresponding to a transmitting side, storing the deciphered PDUs in the receiver buffer, and reassembling the PDUs stored in the receiver buffer and then transmitting the reassembled data to a second upper layer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 illustrates a structure of an AMD PDU;

FIG. 3 illustrates a structure of a status PDU;

FIG. 4 illustrates a structure of a reset ACK PDU;

FIG. 6 illustrates a structure of a UMD PDU;

DETAILED DESCRIPTION OF PREFERRED EMBODIMENTS

Reference will now be made in detail to the preferred embodiments of the present invention, examples of which are illustrated in the accompanying drawings.

In a data transmission device of a radio communication system having an RLC layer, according to the main feature of the present invention, a transmission data reassembling module reassembles service data units (SDUs) received from an upper layer into protocol data units (PDUs). A header adding module then adds headers of the RLC layer to the PDUs. After that, a transmission data storing module stores the PDUs to which the headers are added. A ciphering module ciphers the PDUs to which the headers are added and then transmits the ciphered PDUs to a lower layer.

In a data receiving device of a radio communication system having an RLC layer, according to the main feature of the present invention, a deciphering module deciphers ciphered PDUs of an RLC layer transmitted from a transmitting side through a lower layer. A received data storing module then stores the deciphered PDUs. An RLC header removing module removes headers of the RLC layer from the PDUs. A reassembly module reassembles the PDUs outputted from the RLC header removing module in service data units (SDUs) and then transmits them to an upper layer.

Figure 1:
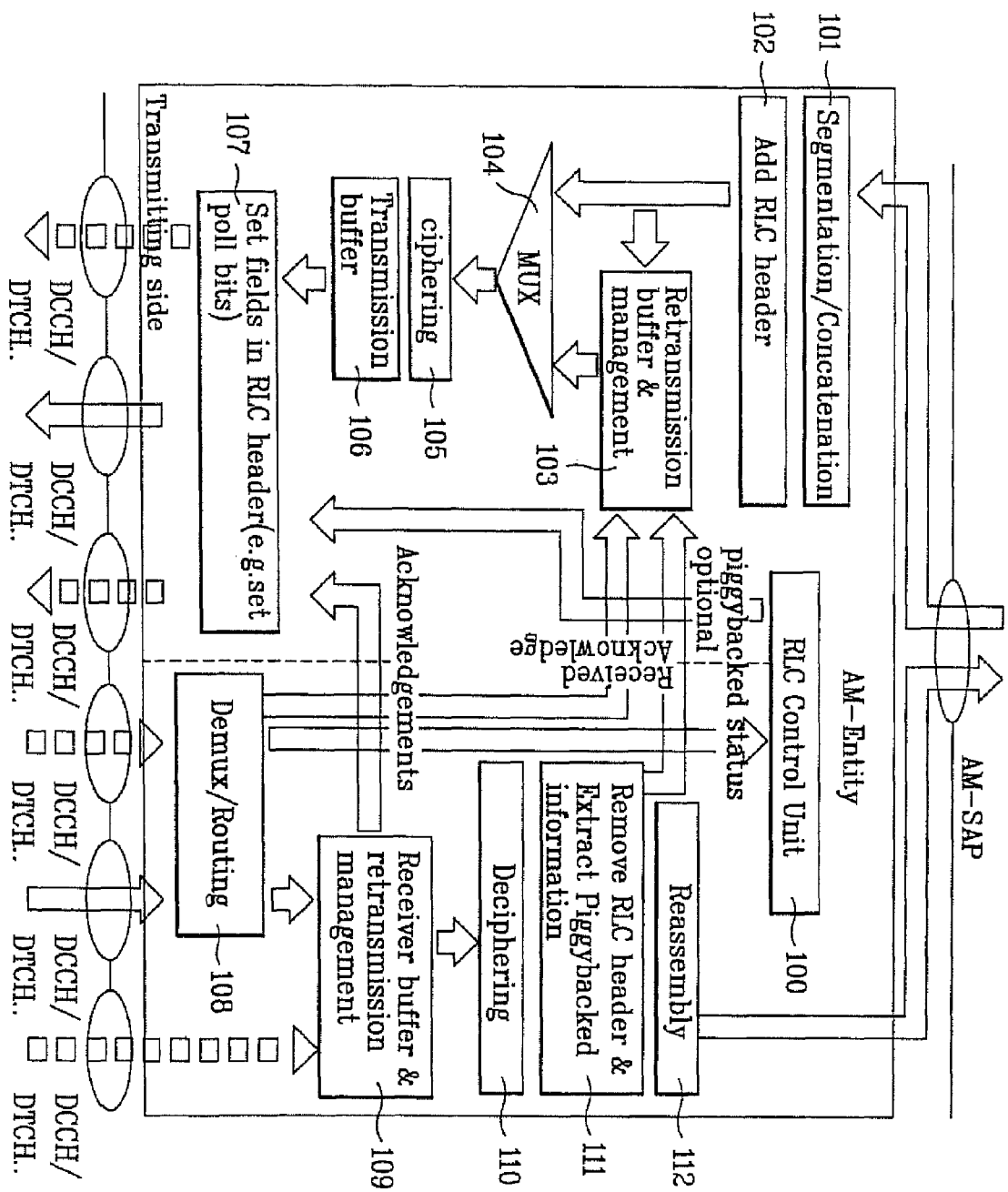
FIG. 1 illustrates a related art block diagram of a radio communication system having an RLC AM entity.
Figure 5:
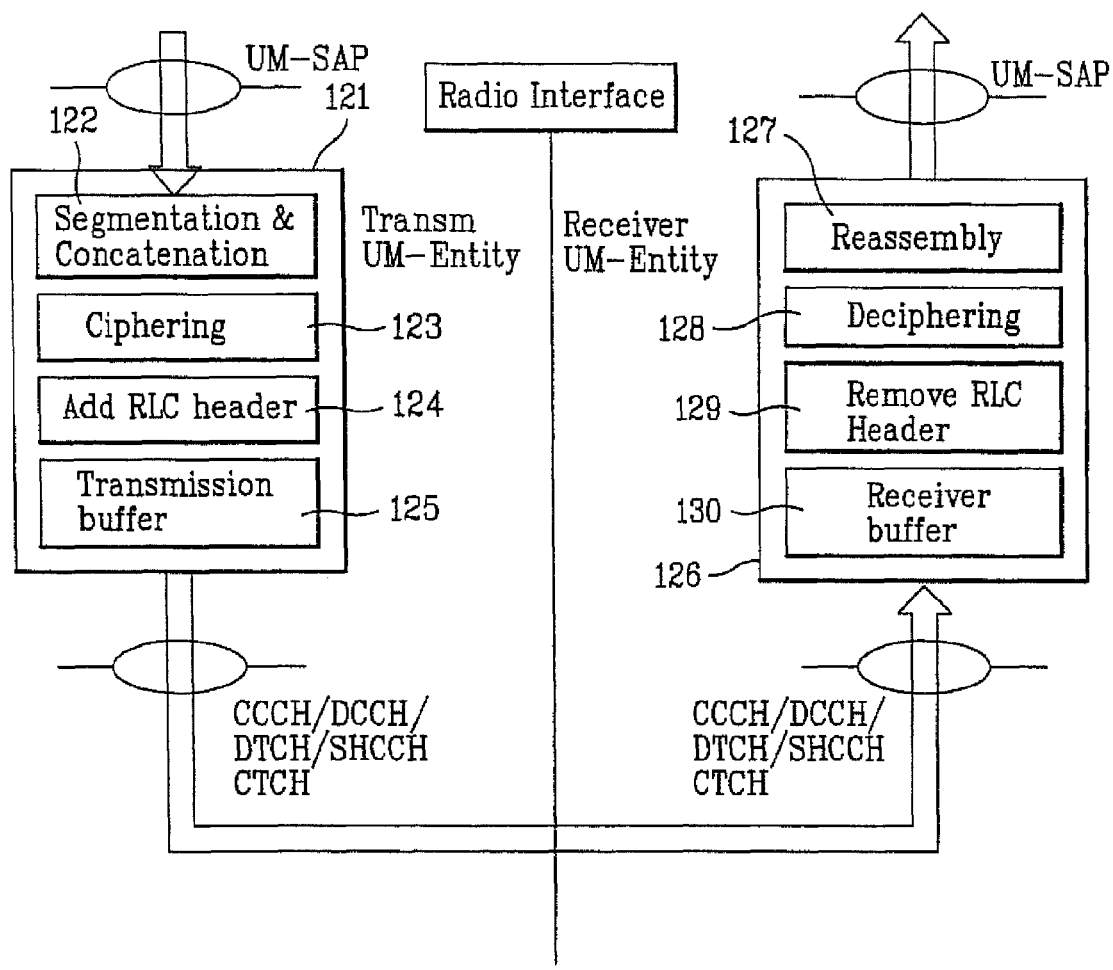
FIG. 5 illustrates a related art construction of a radio communication system having an RLC UM entity.
Figure 7A:
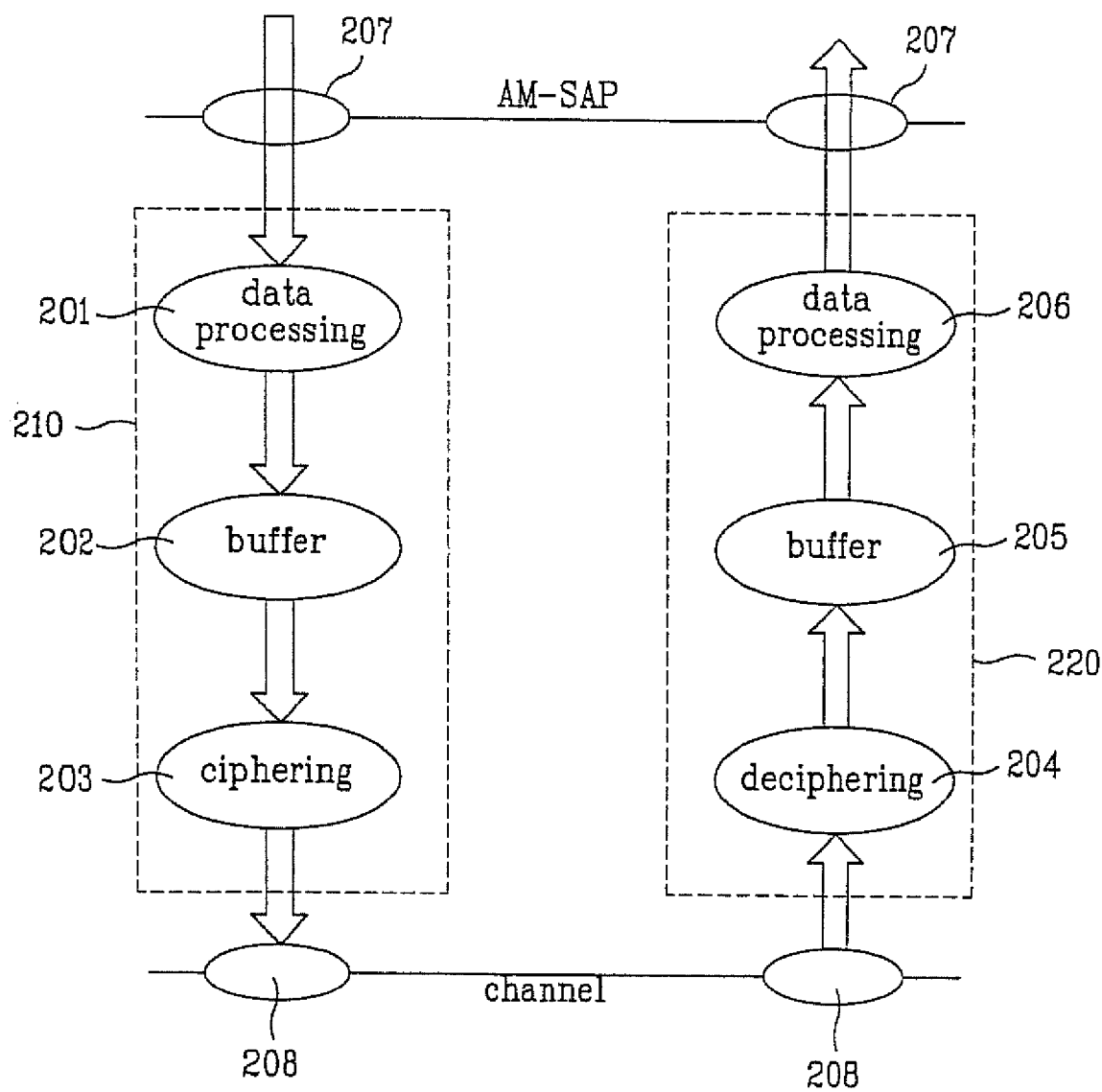
FIG. 7A illustrates a construction of a radio communication system having an RLC AM entity, according to a first preferred embodiment of the present invention.
Figure 7B:
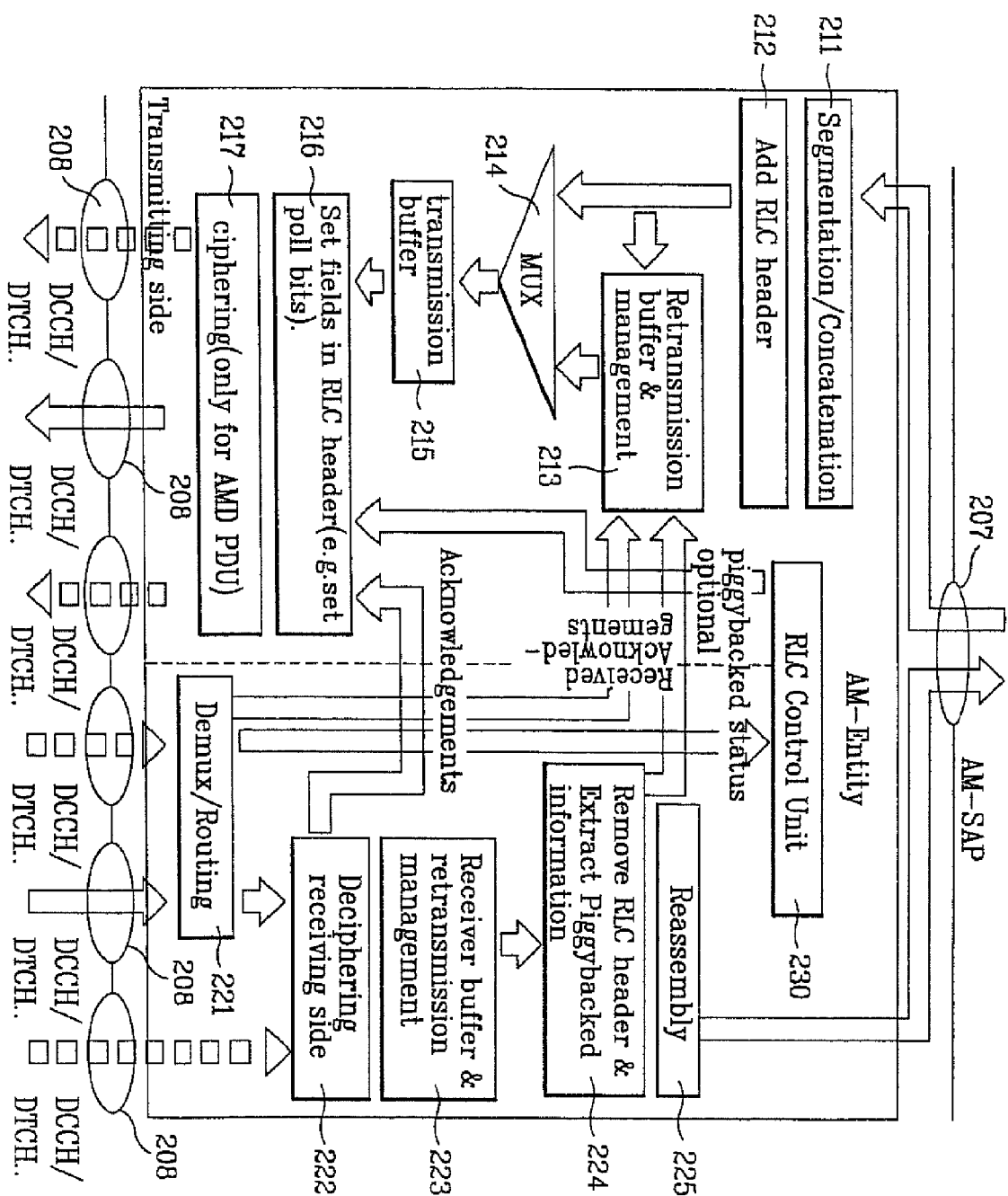
FIG. 7B illustrates the block diagram of FIG. 7A in greater detail.

FIG. 7A illustrates a construction of an RLC AM entity according to a first preferred embodiment of the present invention and FIG. 7B illustrates the block diagram of FIG. 7A in greater detail. The RLC AM entity of the first preferred embodiment is mainly constructed with a transmission module 210, a receiving module 220, and an RLC control module 230. Transmission module 210 is constructed with a first data processing module 201, which converts SDUs transmitted from an upper layer through AM-SAP 207 into PDUs; a transmission data storage module (or transmission buffer) 202 storing the AMD PDUs; and a ciphering module 203. Ciphering module 203 formats the PDUs stored in the transmission buffer 202 into predetermined fields, under the control of the RLC control module 230, and ciphers the PDUs. The ciphered PDUs are transmitted to an RLC AM entity corresponding to a receiving side, through channels DCCH and DTCH.

The receiving module 220 of the RLC AM entity is constructed with a deciphering module 204, which transmits control PDUs and deciphers AMD PDUs; a received data storage module (or receiver buffer) 205 that stores the deciphered AMD PDUs; and a second data processing module 206. The second data processing module 206 reassembles the AMD PDUs stored in the received data storage module 205 into SDU units and then transmits the AMD PDUs to the upper layer, through the AM-SAP 207.

Preferably, the transmission buffer 202 in the RLC AM entity processes the data by SDU unit. Ciphering module 203 checks a D/C field before the PDUs are ciphered. The D/C field check distinguishes the AMD PDUs, which are to be ciphered, from the control PDUs, which are not to be ciphered. If the AMD PDU includes a piggybacked status PDU, the piggybacked status PDU is ciphered but the status PDU is transmitted without being ciphered. The receiver buffer 205 also processes the data by SDU unit.

FIG. 7B illustrates the block diagram of FIG. 7A in greater detail. Transmission module 210 of the RLC AM entity is constructed with a segmentation/concatenation module 211, which performs segmentation and concatenation on SDUs stepped down from an upper layer; an RLC header module 212 forming PDUs by adding sequence numbers to the segmented and concatenated SDUs; a retransmission buffer/management module 213 storing the header-added PDUs for retransmission and management; a multiplexer (or multiplexing module) 214 outputting one of output signals of the RLC header module 212 and the retransmission buffer/management module 213; a transmission buffer (or storage module) 215 storing the unciphered PDUs outputted from the multiplexer 214; a set fields block (or set fields module) 216, which sets a D/C field and other fields in the PDU; and a ciphering module 217, which ciphers the PDUs outputted from the set fields block 216 and transmits the ciphered PDUs to the receiving side.

Preferably, the ciphering module 217 checks the D/C field header of the AMD PDU before ciphering. Control PDUs are not ciphered, but the AMD PDU including any piggybacked status PDU is ciphered. Also, ciphering module 217 checks the AMD PDUs for a PAD so that the PAD may be replaced by a piggybacked status PDU.

Receiving module 220 of the RLC AM entity is constructed with a demultiplexing/routing module 221, which transmits the control PDUs received from transmission module 210 of another entity to the RLC control unit 230 and transmits AMD PDUs to a deciphering block 222; a deciphering module 222 that deciphers the AMD PDUs; a receiver buffer 223 that stores the deciphered AMD PDUs and outputs the stored PDUs as SDU units; a header/piggybacked information removal module 224 that removes the RLC headers and piggybacked information from the PDUs received by the SDU unit; and a reassembly module 225 that reassembles the SDUs constructed with pure data and then transmits them to the upper layer.

Preferably, the demultiplex/routing module 221 of the receiving module 220 checks whether the transmitted PDUs are control PDUs or AMD PDUs, through an examination of the D/C field. Receiver buffer 223 transits the stored PDUs to the upper layer in the form of SDU units.

The first embodiment of the present invention introduces a new RLC AM entity that overcomes the ciphering/deciphering problems of the related art.

In the RLC AM entity structure, transmission module 210 performs the ciphering step in a final stage, positioned after the set fields block. Receiving module 220 of the entity performs the deciphering step in an initial stage positioned before the receiver buffer.

The steps of processing the AMD PDU in the RLC AM entity according to the first embodiment of the present invention will now be explained in detail. One logical channel or two may be applied to the RLC AM entity. When two logical channels are applied, a UTRAN indicates that the first logical channel is used for data PDUs and the second logical channel is used for control PDUs.

If the instruction is not provided by the UTRAN, both the data and control PDUs may be sent through one of the two channels and the identification of the logical channel mapping is signaled by RRC.

SDUs stepped downward from the upper layers are segmented and concatenated, through the segmentation/concatenation module 211, into PDUs having fixed lengths. The length of the PDU is determined by the radio bearer reassembly and a semi-static value, which may be changed through the bearer reassembly by the RRC. Subsequently, the SDUs are conveyed to the RLC header module 212, where headers including sequence numbers are added to the SDUs to form PDUs. The PDUs to which the headers are added are immediately transmitted to the multiplexer 214 and simultaneously stored in the retransmission buffer/management module 213. For the purpose of concatenation and padding, the information bits of the length indicator and extension are inserted into the initial part of the PDU.

Multiplexer 214 outputs PDUs from either the RLC header module 212 or the retransmission buffer/management module 213. The multiplexer 214 determines which PDUs are selected and when the PDUs will be transmitted to the MAC. The PDUs are provided the RLC PDU headers and PDU padding is replaced by the piggybacked status information. PDUs transmitted through the multiplexer 214 are stored in the transmission buffer 215 in an unciphered state. From the transmission buffer 215, the PDUs are transmitted to the set fields block 216. In the set fields block 216, the D/C field and other fields are set as necessary and the AMD PDU is replaced by the piggybacked status PDU, if a PAD exists in the AMD PDU.

Ciphering module 217 ciphers the AMD PDUs outputted from the set fields block 216 and transmits the ciphered AMD PDUs toward receiving RLC AM entity.

Before the ciphering is performed, the header D/C fields of the AMD PDUs are checked. In accordance with the value of the D/C field, ciphering is performed on the AMD PDUs, including the piggybacked status PDU. Ciphering is not carried out on the control PDUs, such as the status, reset, and reset acknowledgment PDUs (reset ACK PDU).

When the piggybacked mechanism is applied, the padding is replaced by control information so as to increase the transmission efficiency and enable faster message exchange between the peer entities. The piggybacked control information is not saved by a retransmission buffer. Piggybacked control information is included in the piggybacked status PDU, which is subsequently included in the AMD PDU. The piggybacked status PDUs have variable sizes so as to be matched with an available amount of free space in the AMD PDU.

Retransmission buffer 213 receives acknowledgment signals from the receiving side, controls the retransmission of PDUs, and determines when a PDU is deleted from the retransmission buffer 213.

The receiving module receives the AMD PDUs through one of the logical channels, from the MAC sub-layer. The RLC PDUs are differentiated and potential piggybacked status information is extracted. The PDUs are stored in the receiver buffer 205 until a complete SDU is received. Receiver buffer 205 may request a retransmission of a PDU by sending negative acknowledgment signal (NACK) to the peer entity.

Demultiplex/routing module 221 of the receiving module 220 judges whether the received PDUs are control PDUs or AMD PDUs, by examining the D/C field. The demultiplex/routing module 221 transmits the received PDUs, to the RLC control module 230, if they are control PDUs, or to the deciphering module 222, if they are AMD PDUs.

Deciphered AMD PDUs are stored in the receiver buffer/retransmission management module 223. Receiver buffer/retransmission management module 223 transmits the received PDUs to the upper module in the form of SDU units.

The header and piggybacked information removal module 224 forms SDUs of pure data, by removing the RLC headers and piggybacked information from the received PDUs. After the headers are removed from the PDUs and the PDUs are reassembled into one SDU, the SDUs are transmitted to the upper layer. Reassembly module 225 reassembles the PDUs constructed with the pure data into the SDUs and then transmits the SDUs to the upper layer through the AM-SAP 207.

Meanwhile, the acknowledgment signals for the received PDUs are passed to the transmission module of the transmitting side.

As mentioned in the above description, the ciphering of PDUs is performed in the final stage of the transmitting module and the PDUs are deciphered in the initial stage of the receiving module. Therefore, the PDUs are stored in the transmission and receiver buffers in an unciphered state. Thus, the transmission and receiver buffers need no deciphering function. Consequently, the PDU processing time in the RLC layers is reduced, since the transmission buffer, set fields block, and receiver buffer require ciphering and deciphering capability.

Moreover, the piggybacked status PDUs are processed with ease in the present invention.

Since PDUs are stored in the receiver buffer in an unciphered state, other functions of the RLC may be performed directly on the SDU unit. Therefore, the data processing speed in the RLC is increased and the AM entity operates in a more stable manner.

Furthermore, the AMD PDUs, but not the control PDUs are ciphered, thereby reducing the processing time of the PDUs.

Figure 8A:
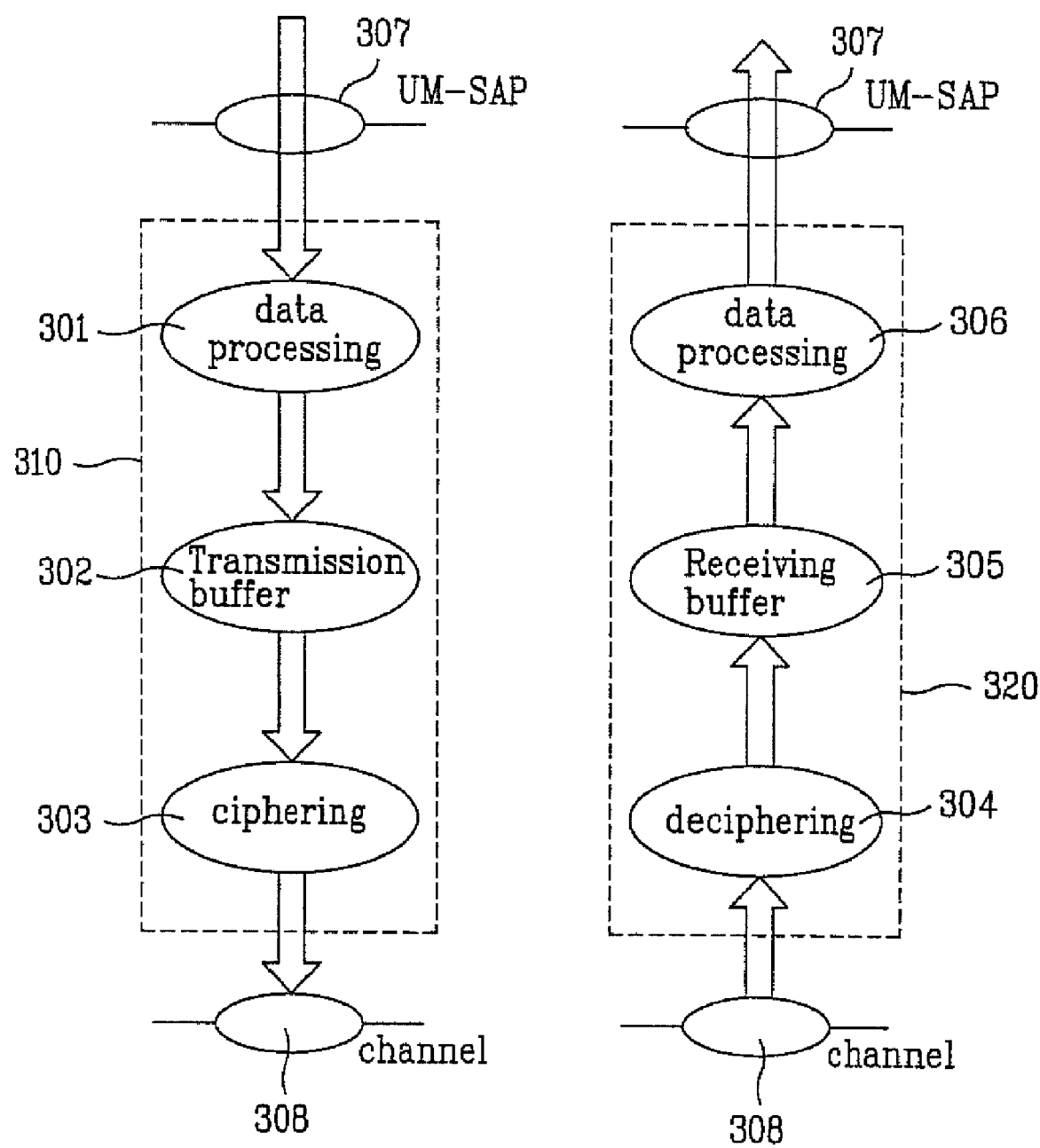
FIG. 8A illustrates a construction of a radio communication system having an RLC UM entity, according to a second preferred embodiment of the present invention.
Figure 8B:
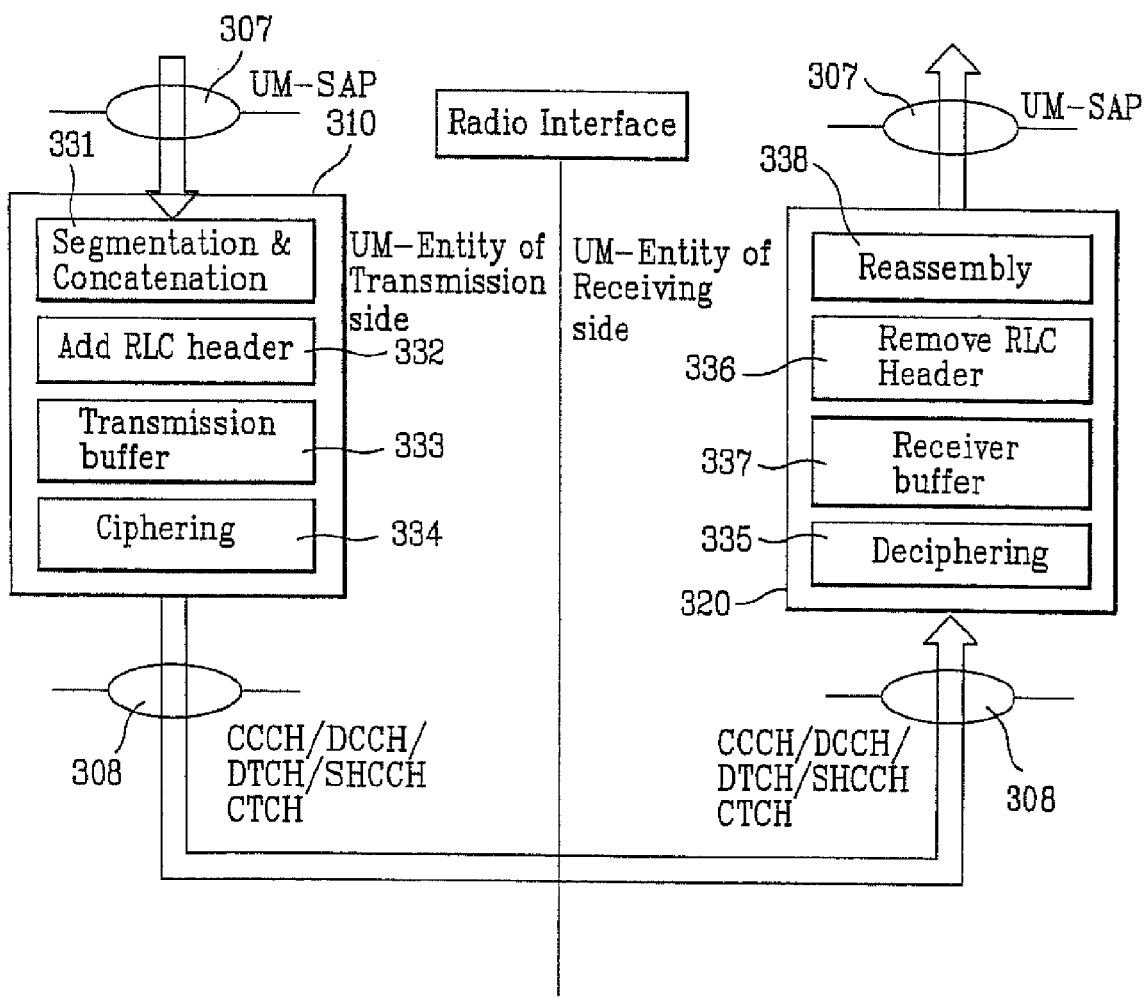
FIG. 8B illustrates the block diagram of FIG. 8A in greater detail.

An RLC unacknowledged mode (UM) entity and its operation according to a second embodiment of the present invention will not be explained. FIG. 8A illustrates a construction of an RLC UM entity according to a second embodiment of the present invention and FIG. 8B illustrates the block diagram of FIG. 8A in greater detail. The RLC UM entity shown in FIG. 9A and FIG. 8B is characterized in that a transmitting module performs the ciphering step after a transmission buffer and a receiving module performs the deciphering step before a receiver buffer.

A transmitting module 310 of the RLC UM entity FIG. 8A is constructed with a first data processing module 301, which converts SDUs stepped down from an upper layer into transmittable PDUs; a transmission data storing module (or transmission buffer) 302 storing the PDUs; and a ciphering module 303 that ciphers the PDUs stored in the transmission data storing module 305 and transmits the ciphered PDUs to a receiving RLC UM entity.

A receiving module 320 of the RLC UM entity in FIG. 8A is constructed with a deciphering module 304, which deciphers the PDUs transmitted from the transmitting RLC UM entity; a received data storing module (or receiver buffer) 305 that stores the deciphered PDUs; and a second data processing module 306 that transmits the PDUs stored in the received data storing module 305 to the upper layer, through UM-SAP 307, in the form of SDU units.

Signal processing module 301 forms the SDUs stepped down from the upper layer into PDUs and adds headers to the PDUs. The transmission buffer 302 stores the UMD PDU and the ciphering module 303 ciphers the UMD PDU stored in the transmission buffer. The transmission buffer processes data by the SDU unit. The ciphered UMD PDU is transmitted to the receiving side of another UM entity through channels such as the CCCH, DCCH, DTCH, SHCCH, and CTCH. In this case, the RLC entity transfers the UMD PDUs to MAC through the channels. The channels CCCH and SHCCH are used for the UM only on a down-link. What channels are used depends on whether the upper layer is located on a control plane or a user plane.

If the upper layer is located on the control plane, the channels CCCH, DCCH, and SHCCH are used. If the upper layer is located on the user plane, the channels CTCH and DTCH are used.

When the ciphered UMD PDU is received from the transmitting UM entity through one of the logical channels, the deciphering part 304 deciphers the received UMD PDU and the receiver buffer 308 stores the deciphered UMD PDU.

An RLC header removing part 336 removes the RLC header from the UMD PDU stored in the receiver buffer 305. A reassembling part 338 reassembles the UMD PDU outputted from the RLC header removing part 309 into RLC SDUs and then transmits the reassembled UMD SDUs to the upper layer through the UM-SAP 307.

The receiver buffer 305 of the RLC UM entity processes data by the SDU unit also.

Referring now to FIG. 8B, the transmitting module 310 of the RLC AM entity is constructed with a segmentation/concatenation module 331, which performs segmentation and concatenation on the SDUs transmitted from the upper layer through the UM-SAP 307; an RLC header module 332, which forms PDUs by adding sequence numbers to the segmented data; a transmission data storing module (or transmission buffer) 333 that stores the PDUs; and a ciphering module 334, which ciphers the PDUs stored in the transmission data storing module 333 and transmits them to the receiving RLC UM entity. The segmentation/concatenation module 331 and the RLC header module 332 in FIG. 8B are equivalent to the first data processing module 301 in FIG. 8A.

Receiving module 320 is constructed with a deciphering module 335, which deciphers the PDUs transmitted from the transmitting RLC UM entity; a received data storing module (or receiver buffer) 337 that stores the deciphered PDUs; an RLC header removing module 336 that removes the RLC headers from the PDUs; and a reassembly module 338, which forms the SDUs. The SDUs are formed by reassembling the PDUs outputted from the RLC header removing module 337. After the SDUs are formed they are transmitted to the upper layer through the UM-SAP 307. The RLC header removing module 336 and the reassembling module 338, in FIG. 8B, are equivalent to the second data processing module 306 in FIG. 8A.

The steps of transmitting and receiving the UMD PDU, in the RLC UM entity, according to the second embodiment of the present invention will now be explained. The SDUs transmitted from the upper layer through the UM-SAP 307 are segmented and concatenated in the segmentation/concatenation module 331 and then provided to the add RLC header module 332. The add RLC header module 332 forms the PDUs by adding headers, including sequence numbers, to the segment data received from the segmentation/concatenation module 331. Transmission buffer 333 stores the PDUs and then outputs them in the form of PDU units. Ciphering module 334 ciphers the PDUs stored in the transmission buffer 333 and transmits the ciphered PDUs to the receiving side RLC UM entity.

The deciphering module 335 of the receiving side RLC UM entity deciphers the PDUs transmitted through the channels. Receiver buffer 337 stores the deciphered PDUs. Then, the receiver buffer 337 provides the PDUs, in the form of SDU units, to the RLC header removing module 336, which removes the headers from the PDUs. The reassembling module 338 forms the SDUs, by reassembling the PDUs outputted from the RLC header removing module 336, and then transmits them to the upper layer.

Figure 8C:
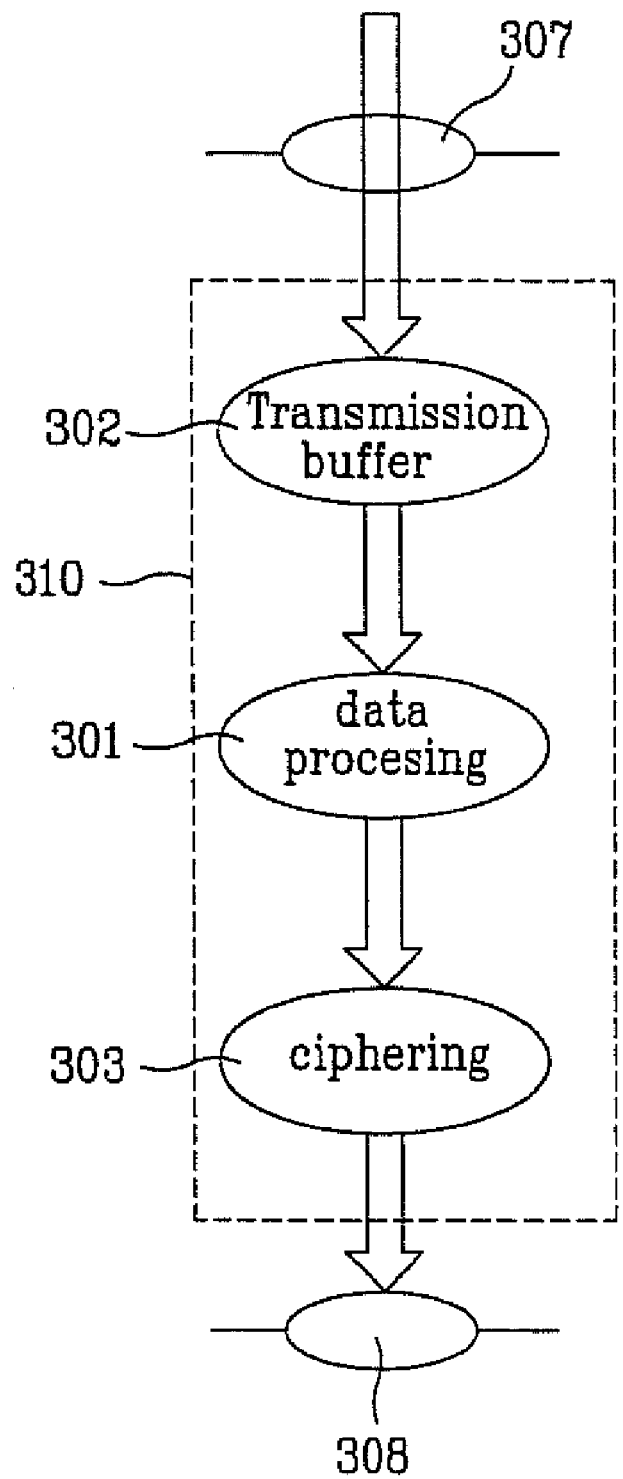
FIG. 8C illustrates a block diagram of another application of FIG. 8A.

FIG. 8C illustrates a block diagram of another application of the RLC UM entity. The order of the first data processing module 301 and the transmission data storing module 302 are reversed from the order shown in FIG. 8A. The transmitting module 310 of the RLC UM entity includes a received data storing module 302, which stores SDUs stepped down from the upper layer; a first data processing module 301, which converts the SDUs stored in the received data storing module into UMD PDUs; and a ciphering module, which ciphers the UMD PDUs stored in the transmission data storing module 302 and then transmits them to the receiving RLC UM entity.

Figure 8D:
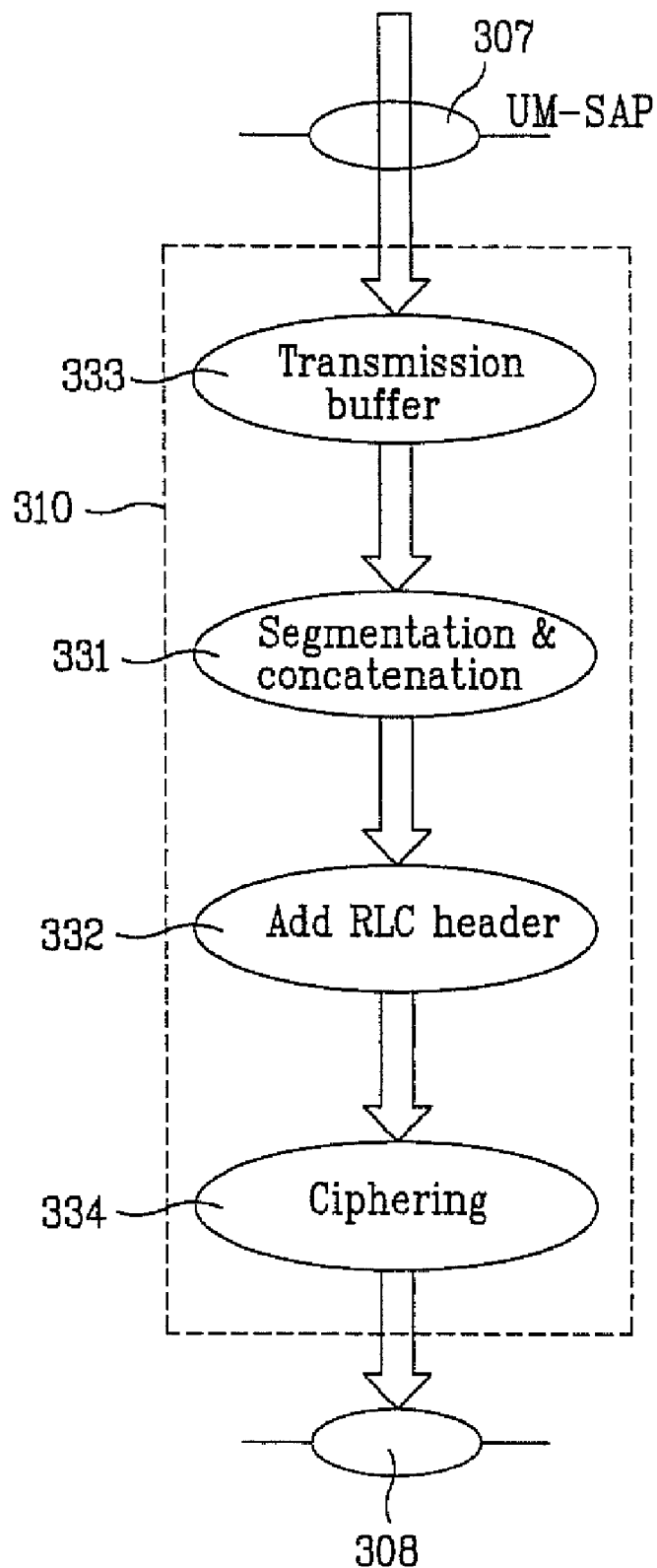
FIG. 8D illustrates the block diagram of FIG. 8C in greater detail.

FIG. 8D is a detailed block diagram of FIG. 8C. The data transmission module 310 includes a transmission data storage module 333 for storing service data units from an upper layer, a segmentation and concatenation module 331 that acts as a transmission data reassembly module for reassembling protocol data units of the RLC layer, an RLC header module 332 for adding headers of the RLC layer to the PDUs reassembled by the segmentation and concatenation module 331, and a ciphering module 334 that ciphers the header-added PDUs and transmits the ciphered PDUs to a lower layer.

The construction of FIG. 8B is identical to that of 8D except that the serial ordering of the transmission data module 333 and the segmentation and concatenation module 331 are reversed. Therefore, the detailed description of 8D will be skipped. The construction of a receiving module 320 is equal to that of FIG. 8A of which an explanation may be found above.

Regarding FIG. 8C, as is the case in FIG. 8A, the SDUs are transmitted to the transmitting module through the UM-SAP 307 from the upper layer. Ciphered PDUs are transmitted toward the receiving RLC entity tough the channels DTCH, DCCH, CCCH, SHCCH, and CTCH by the transmitting module. The ciphered PDUs enter the receiving module trough the channels DTCH, DCCH, CCCH, SHCCH, and CTCH and the PDUs outputted from the second data processing module are transmitted to the upper layer through the UM-SAP. Also, the first data processing module includes a segmentation/concatenation module 331 carrying out segmentation and concatenation on the SDUs transmitted from the upper layer, through the UM-SAP 307, and an RLC header module 332 forming PDUs by adding sequence numbers to the segmented data.

In the RLC UM entity according to the second embodiment of the present invention, the ciphering and deciphering steps are arranged so that the unciphered SDUs are stored in the transmission buffer 333 and the unciphered PDUs are stored in the receiver buffer 336.

Since the transmission buffer 333 and the receiver buffer 336 store unciphered data, they need no deciphering capability.

Accordingly, the RLC UM entity according to the second embodiment of the present invention has the following advantages. First, the ciphering step is arranged as the final processing step in the transmitting module of the entity and the deciphering step is arranged as the initial processing step in the receiving module, thereby enabling the RLC entity to transit and receive PDUs more efficiently. Second, the already-deciphered PDUs are stored in the receiver buffer, thereby enabling the receiving RLC entity to transmit UMD PDUs to the upper layer more effectively and faster. Third, the transmission and receiver buffers require no deciphering function, thereby enabling the RLC entity to reduce the data processing time spent on other RLC functions, such as the SDU discard function.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A transmitting device having an acknowledged mode (AM) radio link control (RLC) entity in a mobile communication system, comprising:
   a segmentation and concatenation module that at least segments or concatenates service data units (SDUs) received from an upper layer;
   a header adding module that adds RLC headers to the at least segmented or concatenated SDUs for forming protocol data units (PDUs);
   a transmission storing module that stores the PDUs to which the RLC headers are added;
   a header field setting module that sets fields of the RLC headers in the PDUs received from the transmission storing module; and
   a ciphering module that ciphers the PDUs output from the header field setting module and then transmits the ciphered PDUs to a lower layer of the transmitting device, wherein the ciphering module checks D/C fields in the headers of the PDUs to determine whether the PDUs are data PDUs or control PDUs and ciphers the PDUs only if the PDUs are data PDUs,
   wherein the ciphering module ciphers piggybacked status PDUs in the data PDUs if the data PDUs include the piggybacked status PDUs.

2. The transmitting device of claim 1, further comprising:
   a retransmission and management module that stores the header-added PDUs for retransmission and management; and
   a multiplexing module that multiplexes the PDUs output from the header adding module and the retransmission and management module.

3. The transmitting device of claim 1, wherein the ciphered PDUs are transmitted to the lower layer through at least one of a plurality of channels for transmission, and the plurality of channels includes a dedicated traffic channel (DTCH) and a dedicated control channel (DCCH).

4. The transmitting device of claim 1, wherein the SDUs are received from the upper layer through an acknowledged mode service access point (AM-SAP).

5. A method of processing data at an acknowledged mode (AM) radio link control layer of a transmitting side in a communication system, the method comprising:
   at least segmenting or concatenating service data units (SDUs) received from an upper layer;
   adding RLC headers to the at least segmented or concatenated SDUs to form protocol data units (PDUs);
   storing the PDUs in a transmission buffer;
   setting fields in the RLC headers of the PDUs output from the transmission buffer; and
   ciphering the PDUs only if the PDUs are data PDUs, wherein whether the PDUs are data PDUs or control PDUs is checked using D/C fields of the RLC headers of the PDUs,
   wherein piggybacked status PDUs in the data PDUs are ciphered if the data PDUs include the piggybacked status PDUs.

6. The method of claim 5, further comprising storing the RLC header-added PDUs for retransmission and management in a retransmission buffer.

7. The method of claim 5, wherein ciphered PDUs are transmitted to a lower layer of the transmitting side through at least one of a plurality of channels for transmission, the plurality of channels includes a dedicated traffic channel (DTCH) and a dedicated control channel (DCCH).

8. The method of claim 5, wherein the SDUs are received from an upper layer through an acknowledged mode service access point (AM-SAP).

* * * * *